(12) United States Patent
Shrivastava et al.

(10) Patent No.: US 7,944,927 B2
(45) Date of Patent: May 17, 2011

(54) EFFICIENT USE OF PERSISTENT SCHEDULING WITH OFDMA WIRELESS COMMUNICATIONS

(75) Inventors: Shweta Shrivastava, Beaverton, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 825 days.

(21) Appl. No.: 11/855,648

(22) Filed: Sep. 14, 2007

(65) Prior Publication Data

US 2009/0073940 A1   Mar. 19, 2009

(51) Int. Cl.
*H04L 12/28* (2006.01)
*H04W 74/04* (2009.01)

(52) U.S. Cl. ........... 370/395.4; 370/329; 455/451

(58) Field of Classification Search .......... 370/203–210, 370/230.1, 395.4, 395.41, 412, 329–338, 370/441–443; 450/450–452.2; 718/102–105; 713/503; 455/450–452.2, 67.1
See application file for complete search history.

(56) References Cited

U.S. PATENT DOCUMENTS

| | | | | |
|---|---|---|---|---|
| 2007/0047502 | A1* | 3/2007 | Marinier et al. | 370/335 |
| 2008/0057969 | A1* | 3/2008 | Agami et al. | 455/450 |
| 2008/0090583 | A1* | 4/2008 | Wang et al. | 455/452.1 |
| 2008/0225783 | A1* | 9/2008 | Wang et al. | 370/329 |
| 2009/0054006 | A1* | 2/2009 | Cai et al. | 455/73 |
| 2009/0274107 | A1* | 11/2009 | Park et al. | 370/329 |
| 2010/0111004 | A1* | 5/2010 | Yi et al. | 370/329 |

* cited by examiner

*Primary Examiner* — Aung S Moe
*Assistant Examiner* — Habte Mered
(74) *Attorney, Agent, or Firm* — John F. Travis

(57) ABSTRACT

Various embodiments of the invention may take advantage of persistent scheduling in a wireless network to achieve efficiencies of operation. One embodiment dynamically adjusts the duration of persistent scheduling based on changing channel conditions. When mobile stations are grouped together for persistent scheduling, another embodiment uses a bitmap to indicate which mobile stations in the group have data in the current frame. Still another embodiment eliminates the Connection Identifier from a packet header when bitmaps are being used.

14 Claims, 11 Drawing Sheets

| MS# | MCS | GROUP# |
|---|---|---|
| MS1 | MCS4 | 4 |
| MS2 | MCS4 | 4 |
| MS3 | MCS4 | 4 |
| MS4 | MCS2 | 2 |
| MS5 | MCS2 | 2 |
| MS6 | MCS2 | 2 |
| MS7 | MCS2 | 2 |
| MS8 | MCS2 | 2 |
| MS9 | MCS2 | 2 |

FIG. 5

Bitmap for MCS4 Group (Group 4)

| MS1 | MS2 | MS3 |
|---|---|---|
| 1 | 0 | 1 |

— 640

Bitmap for MCS2 Group (Group2)

| MS4 | MS5 | MS6 | MS7 | MS8 | MS9 |
|---|---|---|---|---|---|
| 0 | 0 | 1 | 1 | 0 | 1 |

| HT(1) | EC(1) | TYPE(6) | ESF(1) | CI(1) | EKS(2) | HI=0 (1) | LEN (11) | CID (16) | HCS (8) |

FIG. 10A

| HT(1) | EC(1) | TYPE(6) | ESF(1) | CI(1) | EKS(2) | HI=1 (1) | LEN (11) | HCS (8) |

FIG. 10B

EFFICIENT USE OF PERSISTENT SCHEDULING WITH OFDMA WIRELESS COMMUNICATIONS

BACKGROUND

Some types of wireless communication techniques (for example, orthogonal frequency division multiple access, or OFDMA) permit simultaneous communications between a base station and multiple mobile stations by using multiple sub-channels that can be dynamically shared among the multiple mobile stations. For each frame, the base station may assign each mobile station to a combination of one or more particular sub-channels, one or more particular time slots, and a particular modulation and coding scheme (MCS). Communicating this dynamically changing information to all the mobile stations in each frame can consume of a lot of overhead, using up bandwidth in the network that might otherwise be used for communicating end-user data. "Persistent scheduling" has been proposed as a way to improve this situation by assuming these parameters will be unchanged for multiple consecutive frames (the period of persistence), thereby eliminating the need to repeat all of this information within each frame during the period of persistence. However, the use of persistent scheduling can create new inefficiencies.

BRIEF DESCRIPTION OF THE DRAWINGS

Some embodiments of the invention may be understood by referring to the following description and accompanying drawings that are used to illustrate embodiments of the invention. In the drawings:

FIG. 5 shows the mobile stations of FIG. 4 organized into groups that share a common MCS, according to an embodiment of the invention.

FIG. 6 shows bitmaps that may be used with the groups of FIG. 5, according to an embodiment of the invention.

FIGS. 10A and 10B show two types of headers for a packet, according to an embodiment of the invention.

DETAILED DESCRIPTION

Figure 1:
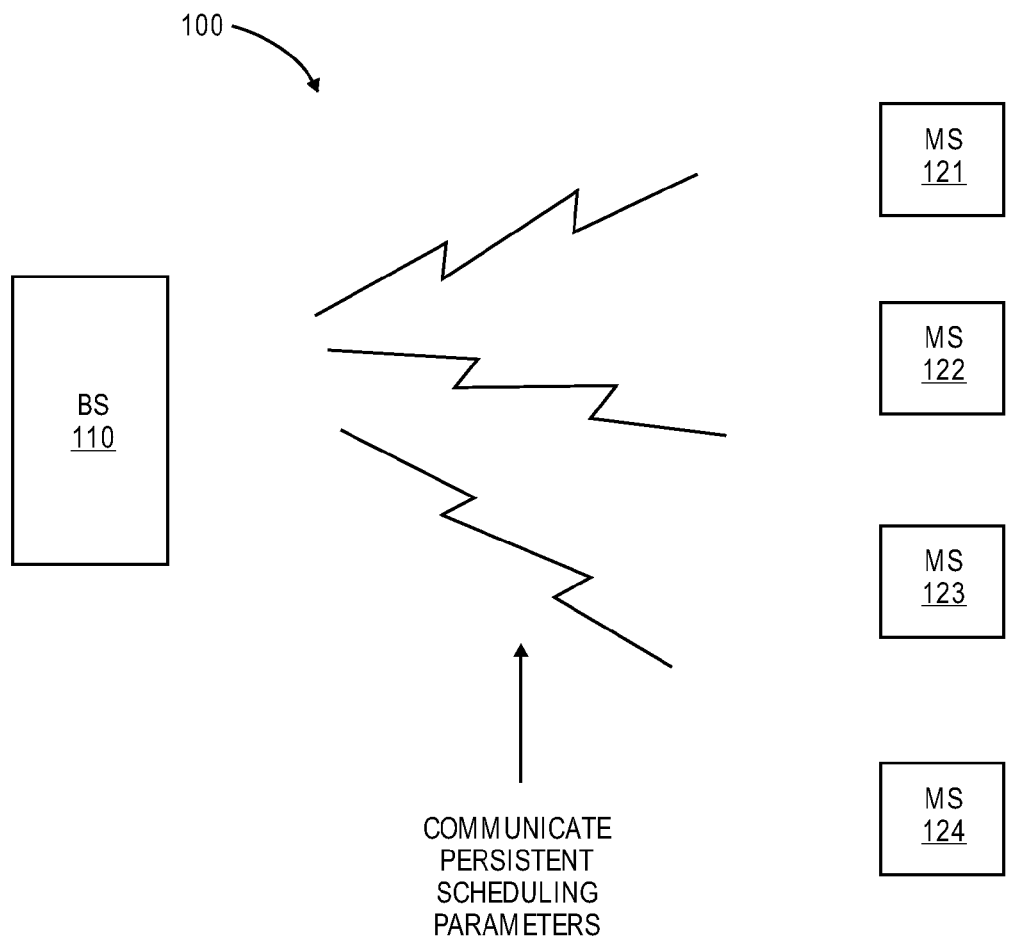
FIG. 1 shows a wireless communications system, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a tangible storage medium, such as but not limited to read only memory (ROM); random access memory (RAM); magnetic disk storage media; optical storage media; a flash memory device, etc. A machine-readable medium may also include a medium for carrying a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile wireless device" is used to describe a wireless device that may be in motion while it is communicating. The term "base station" is used to describe a wireless device that controls communications between itself and one or more mobile stations, and is typically fixed in place during these communications.

Some embodiments of the invention may dynamically adjust the duration of persistent scheduling for a mobile station, for example when changing channel conditions make this desirable. Other embodiments may place multiple mobile stations with a common modulation and coding scheme (MSC) into a group, with a bit map indicating which of the mobile stations in the group are being addressed within the current frame. Still other embodiments may eliminate a portion of the header for certain types of packets, based on efficiencies made possible by such grouping.

FIG. 1 shows a wireless communications system, according to an embodiment of the invention. In the illustrated system 100, a base station 110 may wirelessly communicate with multiple mobile stations 121-124, with each station 110, 121, 122, 123, and 124 having one or more antennas. The base station and every mobile station may each contain at least one processor and a memory with instructions, which may be operated to perform various functions as described herein. A part of the communication between the base station and each mobile station may be devoted to specifying the parameters to be used in subsequent communications. For example, particular time slots, sub-channels, and modulation and coding schemes (MCS) may be assigned to each mobile station by the base station, and those assignments may be communicated to the mobile stations from the base station. Persistence scheduling may be used, in which the particular time slots and/or sub-channels and/or MCS for a particular mobile station are assigned for a duration of more than one communications frame, so that this information does not have to be repeated in each of those frames.

Within this document, a 'period of persistence' is the time for which some initially-specified communication parameters are intended to continue before they are to be re-specified. For example, if a particular set of time slots, sub-channels, and MCS for a given mobile station are specified to last for 10 frames before they need to be re-specified to the mobile station, then the period of persistence is 10 frames that are directed to this mobile station (frames that are not directed to this mobile station should not be counted for this purpose). Period of persistence may also be specified in time (e.g., microseconds, milliseconds, etc.) rather than units of communication such as frames.

Particular techniques may be used in persistent scheduling to obtain particular advantages, as described in the following paragraphs.

Dynamic Adjustment of Persistent Scheduling

Figure 2:
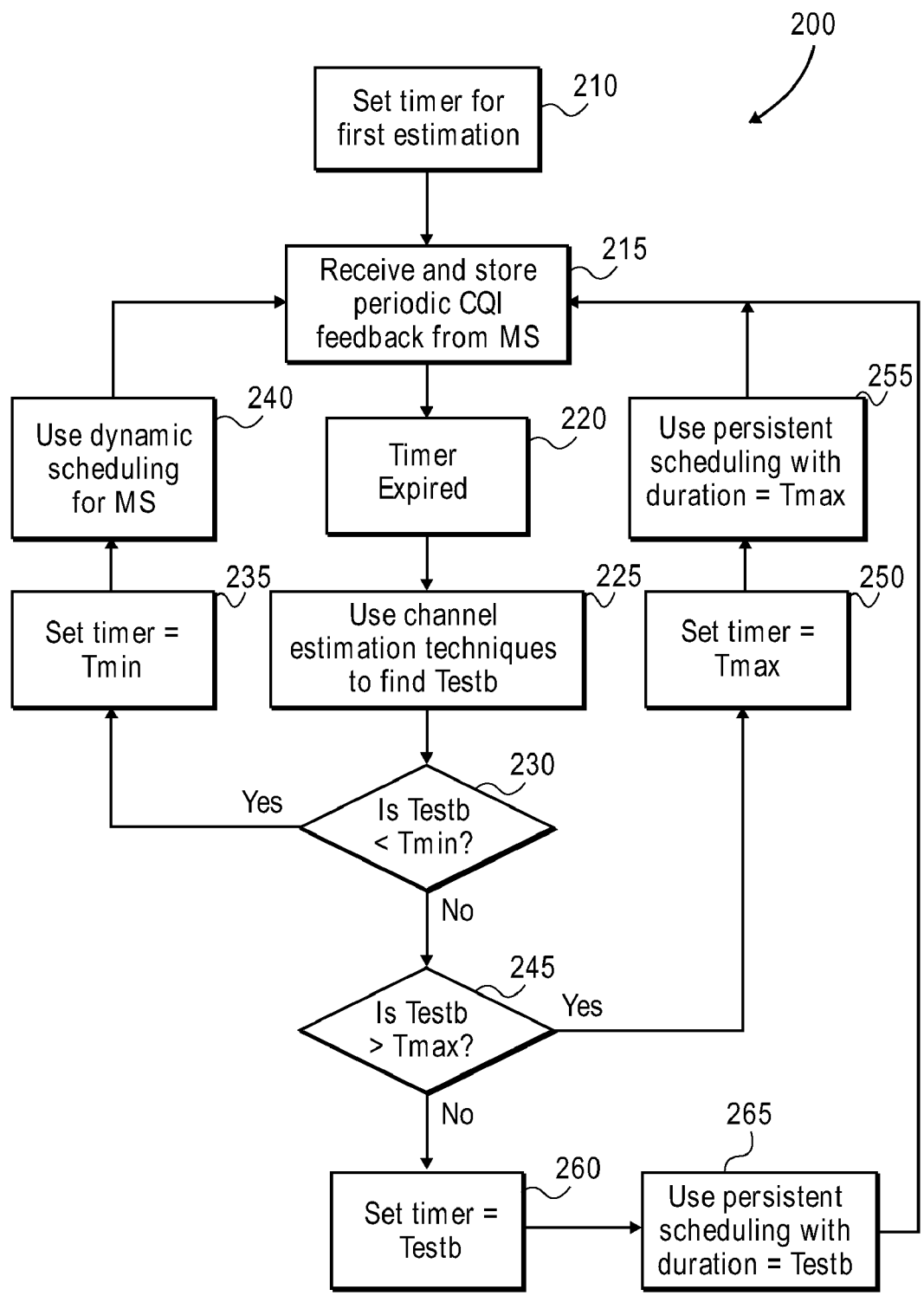
FIG. 2 shows a flow diagram of a method of dynamically determining the duration of persistent scheduling, according to an embodiment of the invention.

FIG. 2 shows a flow diagram of a method of dynamically determining the duration of persistent scheduling, according to an embodiment of the invention. The operations of FIG. 2 may be performed in a base station to determine how long a period of persistence should last for a particular mobile station. In the illustrated flow diagram 200, at 210 the base station may start a timer to measure a period of time for gathering information on channel conditions for the mobile station. Separate sets of information may be collected for each mobile station, since each mobile station may experience different channel conditions (due to, for example, differences in distance from the base station, sources of local interference, obstacles that block the communications path, different receiver sensitivities in the mobile stations, etc.). This information may be collected by the mobile station and provided to the base station at 215 in various forms, such as in a parameter called a channel quality indicator (CQI).

After the channel condition information has been collected for a sufficient period of time, as indicated by the timer expiring at 220, the base station may use channel estimation techniques at 225 to estimate a suitable period of persistence, indicated here as Testb (Testb meaning the time period estimated by the base station). After determining a value for Testb based on channel conditions, this value of Testb may be compared against some predetermined minimum and maximum limits Tmin and Tmax. Testb may be used for two purposes: 1) to set the duration of the next period of persistence, and 2) to set the duration of the timer that determines how long to collect CQI data before recalculating Testb. In other words, CQI information may be collected as long as the period of persistence lasts, and then used to calculate the next Testb. If Testb is less than Tmin, as determined at 230, persistent scheduling may not be a feasible alternative at this time. In such a case, at 235 the duration of the timer may be changed to Tmin to reduce the measurement period for CQI information, and dynamic scheduling may be used at 240 (dynamic scheduling means that persistent scheduling is not being used, so that each frame specifies the communications parameters that apply only to that frame). Note: since a single frame can contain separate communications parameters for each of multiple mobile stations, persistent scheduling may be used for some mobile stations, while dynamic scheduling is being used for other mobile stations, in the same frame.

If Testb is not less than Tmin, but is greater than Tmax as determined at 245, then the duration of the timer may be increased to Tmax at 250, while the period of persistence may also be set to Tmax and this value communicated to the mobile station at 255. If the comparisons at 230 and 245 determine that the calculated value of Testb is between Tmin and Tmax, then the calculated value of Testb from 225 may be used to set the timer at 260 and also used for the period of persistence which is communicated to the mobile station at 265. Within the context of this document, any reference to the value of the period of persistence, or the duration of this time period, encompasses a direct expression of this value and/or an indicator which may be converted into the value.

Figure 3A:
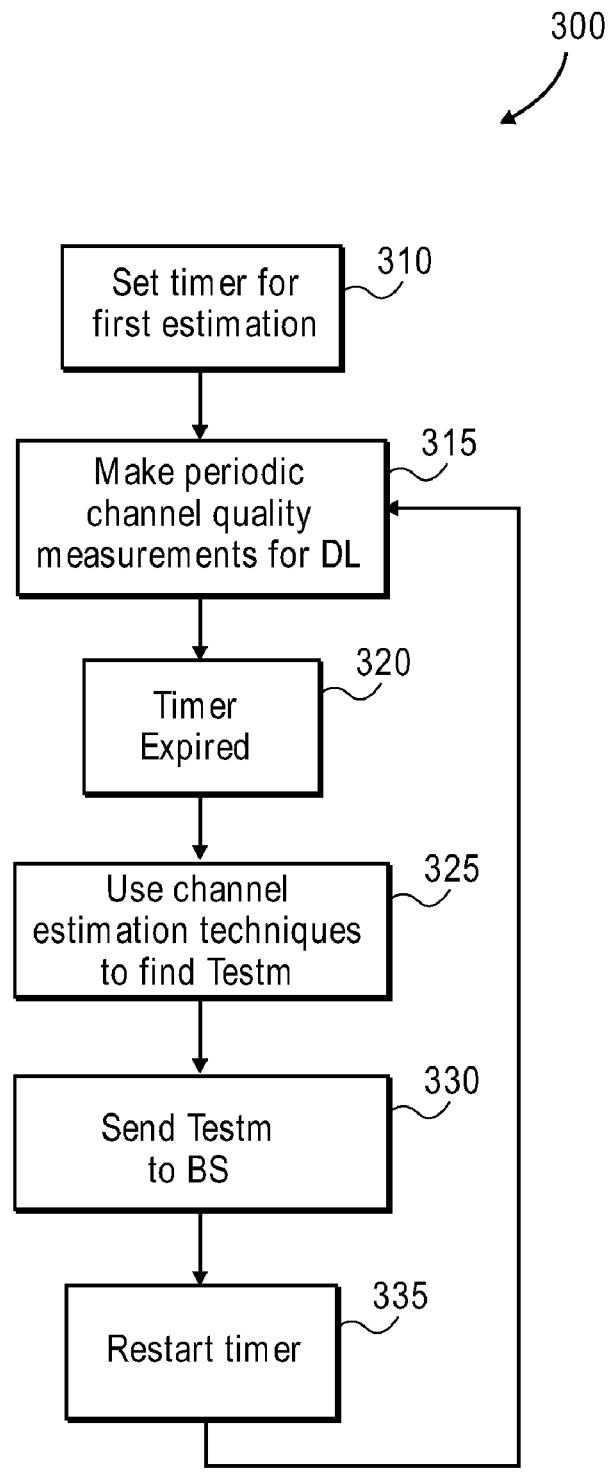
FIGS. 3A and 3B show flow diagrams of another method of dynamically determining the duration of persistent scheduling, according to an embodiment of the invention.
Figure 3B:
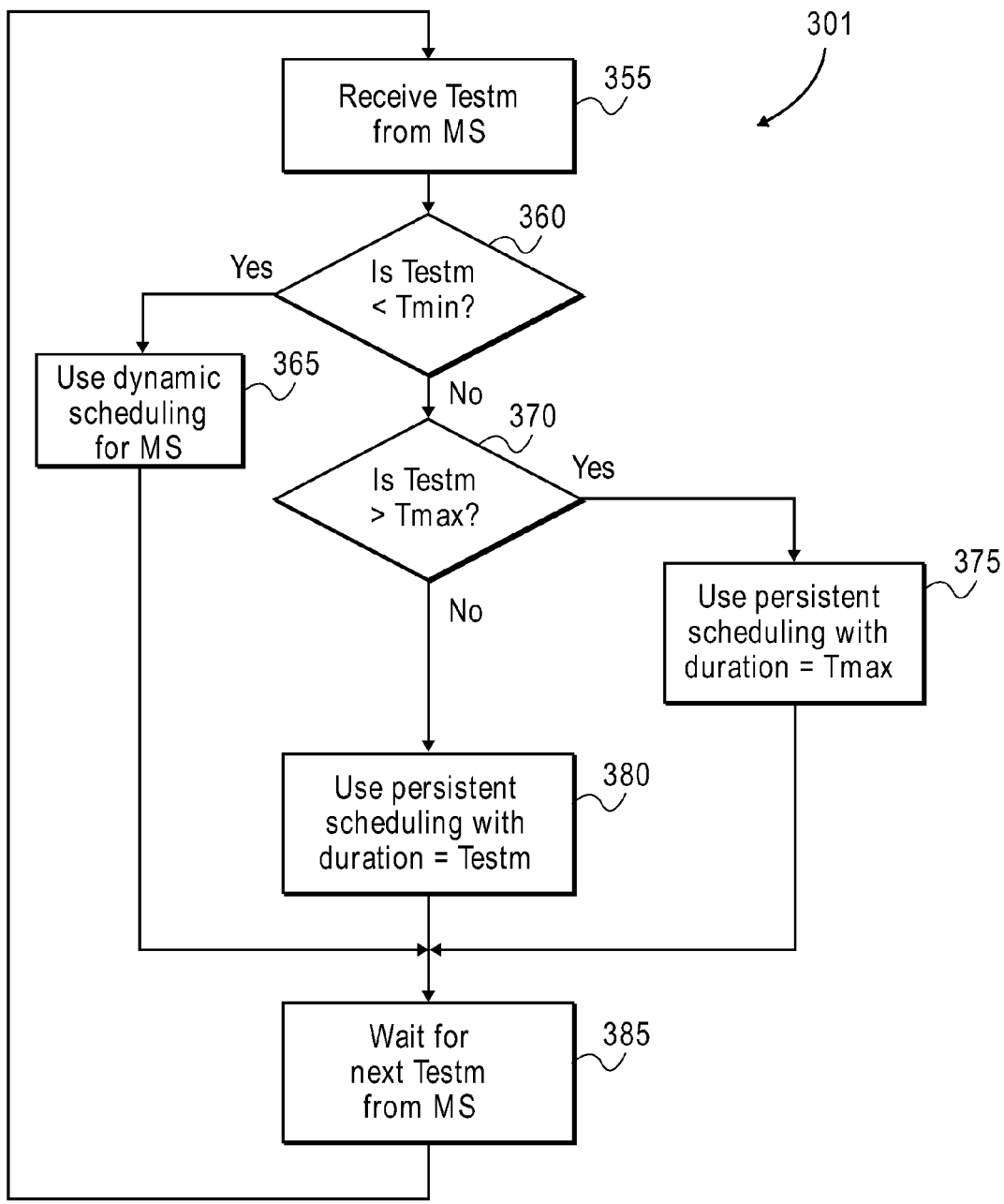

FIGS. 3A and 3B show flow diagrams of another method of dynamically determining the duration of persistent scheduling, according to an embodiment of the invention. The operations of FIG. 3A may be performed in a mobile station to determine how long a period of persistence should last for that particular mobile station. In the illustrated flow diagram 300, at 310 a timer is set to measure a period of time for making channel quality measurements at 315 for downlink communications. When the timer expires at 320, channel estimation techniques may be used by the mobile station at 325 to estimate a suitable period of persistence, indicated here as Testm (Testm meaning the time period estimated by the mobile station). This value of Testm may then be communicated to the base station at 330, and the mobile station may reset the timer at 335 to begin a new period of measuring channel conditions. In some embodiments, the previous value for the timer may be used again, but in other embodiments the value may be changed.

The operations of FIG. 3B may be performed in a base station to further process the parameter Testm after that parameter is received from the mobile station. In flow diagram 301, at 355 Testm is received from the mobile station. This value may then be compared with the minimum and maximum values Tmin and Tmax at 360 and 370, respectively. If Testm is less than Tmin, persistent scheduling may not be a feasible alternative at this time, and dynamic scheduling may be used for the mobile station at 365. If Testm is not less than Tmin, but is greater than Tmax, the period of persistence may be set to Tmax at 375. If Testm is between the values of Tmin and Tmax, then the period of persistence may be set at 380 to the value Testm that was received from the mobile station. Regardless of which value is used for the period of persistence, that value may be communicated to the mobile station. At 385, the base station may continue with communications and other tasks until it receives another value of Testm from the mobile station, at which time the cycle may be repeated.

In the foregoing manner, a period of persistence may be determined which allows for reduced overhead in the communications by using the same communication parameters for a mobile station for multiple consecutive frames, without having to repeat those parameters in every frame. The period of persistence may be limited to a predetermined maximum value if the calculated value is so long that changing channel conditions are likely to degrade the communications. Similarly, if the calculated value is so small that persistent scheduling would likely be less efficient than dynamic scheduling, then dynamic scheduling may be used instead. In some embodiments, separate calculations may be made for uplink and downlink communications. For example, one set of values for Testb and/or Testm may be used for uplink communications, while a different set of values for Testb and/or Testm may be used for downlink communications, for the same mobile station. Similarly, different values of Tmin and Tmax may be used for uplink and downlink.

Mobile Stations Grouped by Common MCS

Figure 4:
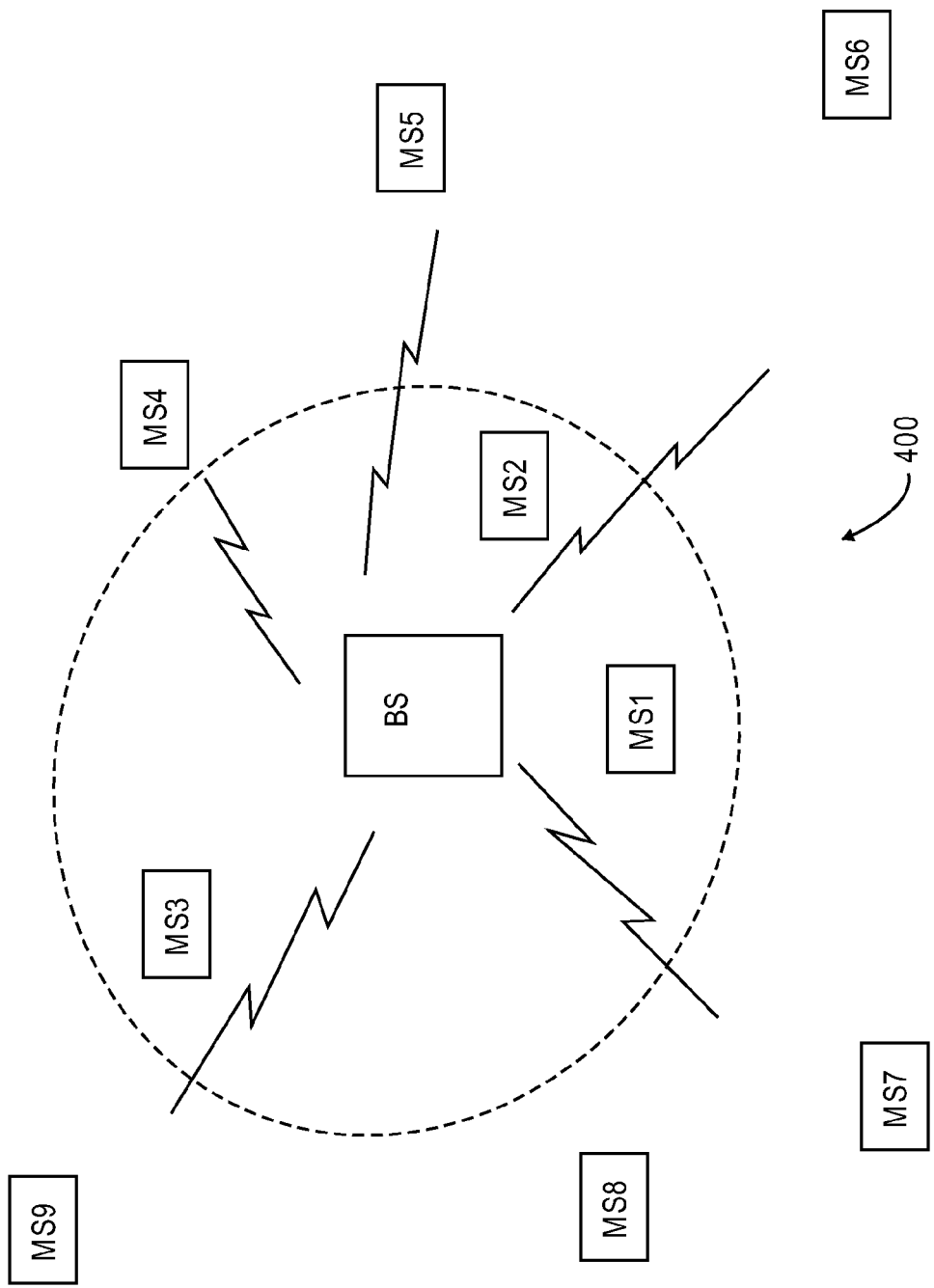
FIG. 4 shows a wireless network with multiple mobile stations communicating with a single base station, according to an embodiment of the invention.

FIG. 4 shows a wireless network with multiple mobile stations communicating with a single base station, according to an embodiment of the invention. In the illustrated network 400, a base station BS is communicating with nine mobile stations, labeled MS1 through MS9, in its network. As shown, the mobile stations may be located at various distances, and in various directions, from the base station. The base station may establish a separate modulation and coding scheme (MCS) with each mobile station, specifying particular parameters for modulation rate, frequency, coding, etc. for each one. The particular MCS chosen for each may depend on various factors, such as but not limited to such things as signal strength, interference, reflected signals, signal to noise ratio, capabilities of the mobile station, type of data being communicated, etc. In the illustrated network, MS1-MS3 are closer to the base station, and might therefore have better channel conditions, than the other six mobile stations, but distance alone might not be the determining factor in such a determination. This distance-only assumption is shown here only to simplify the following explanations for FIG. 5.

FIG. 5 shows the mobile stations of FIG. 4 organized into groups that share a common MCS, according to an embodiment of the invention. The example shows MS1-MS3 using a particular MCS indicated as MCS4, and placed into a group labeled Group 4. MCS4 may have a particular set of parameters that are different than the parameters for MCS2, the MCS that is being used for communications with mobile stations MS4-MS9, which are grouped together in the group labeled Group 2. Grouping the mobile stations into groups that share a common MCS may simplify overall communications for the base station. For example, all the MS's in a particular group may be scheduled for communication in the same frame. For simplicity of illustration, only nine MS's and two MCS's are shown, but any feasible number of either may be used in a network at any given time.

FIG. 6 shows bitmaps that may be used with the groups of FIG. 5, according to an embodiment of the invention. When the base station is communicating with any of the MS's of Group 4, a bitmap 640 may be used to indicate which of those three MS's is scheduled for communication in the frame. For example, a '1' in the bit position for MS1 and MS3 may indicate that MS1 and MS3 are scheduled for communication in the frame that is devoted to group 4, while a '0' in the bit position for MS2 indicates that MS2 is not scheduled for communication in that frame and may safely ignore the rest of the frame. In some embodiments, the opposite polarity may be used (i.e., 0=communication, 1=no communication). A multi-bit indicator for each MS may also be used, but is not shown here. Similar to bitmap 640, a bitmap 620 for group 2 may indicate which of the MS's in group 2 are scheduled for communication in this frame (e.g., MS6, 7, and 9 in the indicated example), while the remaining MS's may ignore the remainder of the frame. Although a single bitmap is shown for each group in each frame, in some embodiments two separate bitmaps may be used in the same frame, one for uplink communications and the other for downlink communications. The order of the bits in the bitmap may indicate the order in which the data will appear in the frame (e.g., the data for the mobile station assigned to the first bit will be transmitted first, the data for the mobile station assigned to the second bit will be transmitted next, etc.). The mobile stations in the group may be assigned to particular bit positions in the bitmap in any feasible manner.

Due to changing channel conditions for each mobile station, the MCS assigned to each mobile station may change with time. Since each group contains only mobile stations that are using the same MCS, this dynamic changing of MCS assignments may result in a mobile station having to be moved to a different group. This in turn may result in a different set of mobile stations being indicated within the same bitmap. If a mobile station is removed from a particular group, the bitmap for that group may be shortened to accommodate a smaller number of mobile stations, and this may result in rearranging which mobile station is assigned to each bit position in the bitmap. Similarly, adding a mobile station to a particular group may increase the size of the associated bitmap, and possibly result in rearranging which mobile station is assigned to each bit position in that bitmap. In other embodiments, the size of the bitmap may be fixed (e.g., at some predetermined maximum feasible size), but the assignment of bit positions within the bitmap may still change dynamically. In embodiments that have separate uplink and downlink bitmaps, each bitmap may be handled independently of the other, resulting in a mobile station having a possibly different bit position in each of the two bitmaps. Further, a mobile station may be in one group for uplink and another group for downlink, and thus may be in one bitmap but not in the other bitmap within a particular frame.

Figure 7:
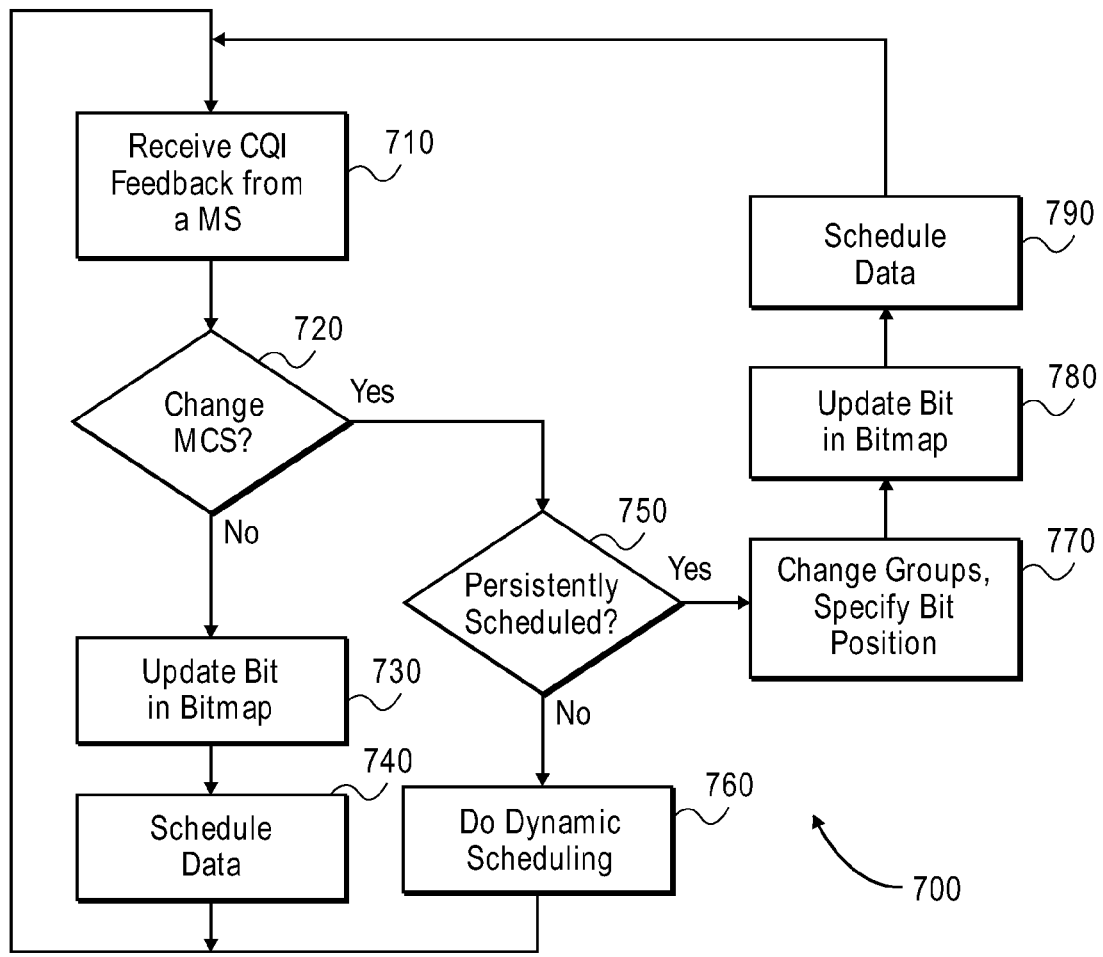
FIG. 7 shows a flow diagram of a method of adjusting bitmaps within a base station, according to an embodiment of the invention.

FIG. 7 shows a flow diagram of a method of adjusting bitmaps within a base station, according to an embodiment of the invention. The results of the process of flow diagram 700 may be applied to an individual mobile station. The process may be performed separately by the base station for other mobile stations. At 710, the base station may receive channel condition information (e.g., Channel Quality Indicator information, or CQI) from a particular mobile station, indicting the condition of the channel for that particular mobile station. Based on this information (e.g., by using the techniques described in FIG. 2 or in FIGS. 3A, 3B) the base station may determine at 720 if a different MCS needs to be used with the mobile station. If not, the base station may update the bitmap position assigned to this mobile station at 730, indicating if the mobile station will communicate in the upcoming frame, and if it will, schedule the data at 740 that is to be transmitted to the mobile station.

However, if the MCS for this mobile station is to be changed at 720, it may be determined at 750 whether persistent scheduling is to be used with this mobile station. If not, dynamic scheduling may be used at 760, in which the MCS parameters will only apply to the current frame, this mobile station will not belong to a group, and will therefore not be assigned a bit position in any bitmap for a group. If persistent scheduling is to be used, as determined at 750, the mobile station may be reassigned at 770 to a group using the new MCS, and assigned a new bit position within the bitmap for that group. This newly-assigned bit in the bitmap may then be updated at 780 to indicate if the mobile station is to communicate data in this frame. If so, that data may be scheduled at 790.

The base station may use certain thresholds to determine whether to move a base station to a different MCS and therefore to a different group. For example, channel conditions may have to improve by a specified minimum amount, and those improved channel conditions may have to persist for a minimum amount of time, before reassigning the mobile station to a higher MCS level and therefore to a different group. Similarly, channel conditions may have to degrade by a minimum amount for a minimum amount of time before reassigning the mobile station to a lower MCS level. Meeting each threshold may require sustaining a defined minimum amount of change for a defined minimum amount of time. The thresholds may be different for uplink and downlink reassignments. Further, using a range of thresholds may permit changing by two or more MCS levels if the improvement or degradation is sufficient to justify it.

Figure 8:
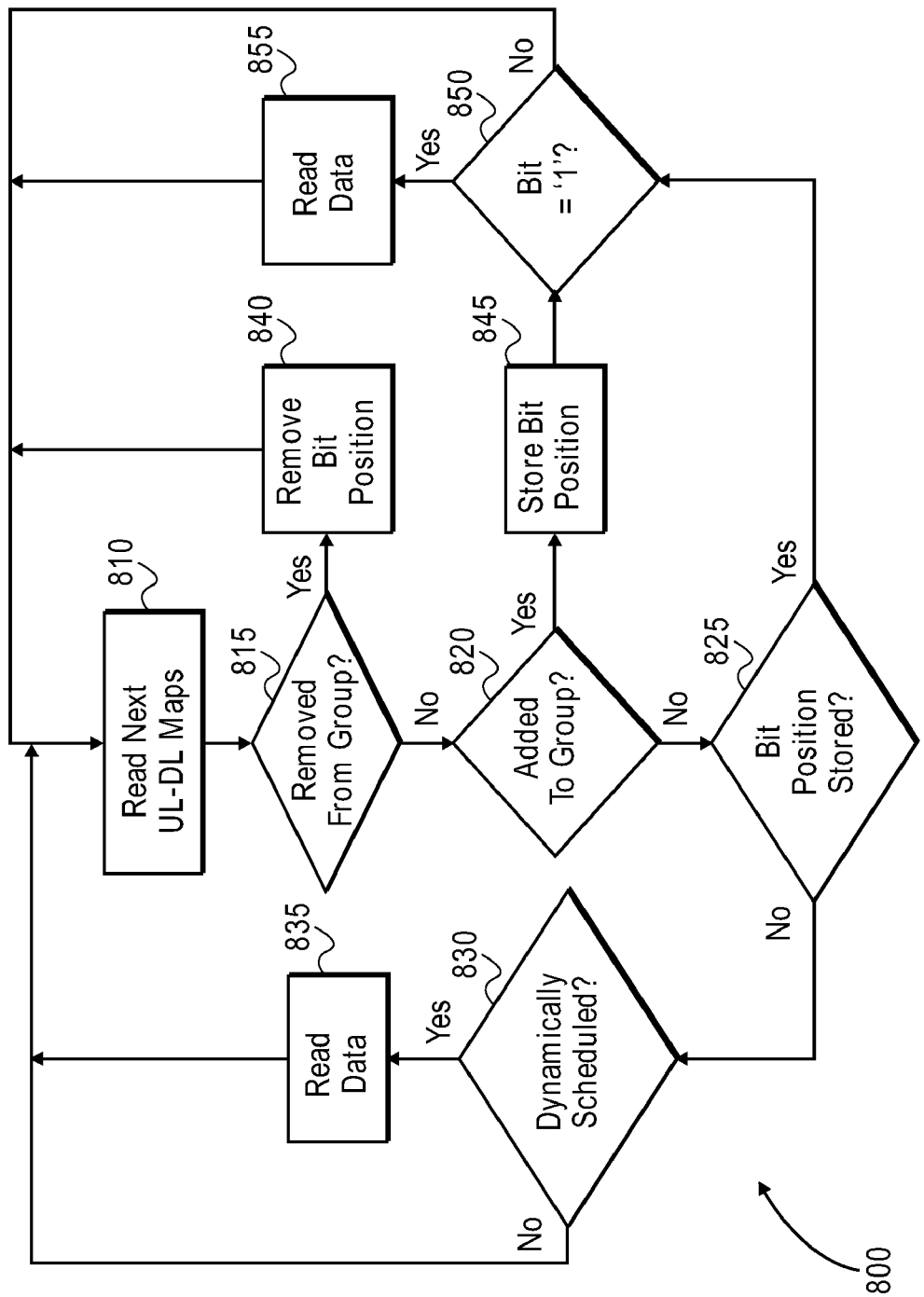
FIG. 8 shows a flow diagram of a method of a handling, within a mobile station, a change in the bitmap assignment, according to an embodiment of the invention.

FIG. 8 shows a flow diagram of a method of a handling, within a mobile station, a change in the bitmap assignment, according to an embodiment of the invention. The process of flow diagram 800 may be performed in response to a change in bitmap assignment made by a base station. At 810, a mobile station may read the Uplink and Downlink maps in a downlink sub-frame received from the base station, to determine the new status of the mobile station. If the UL-DL maps indicate at 815 that this mobile station has been removed from the current group that is targeted by this frame, then at 840 the mobile station may change its internal indicator that had previously assigned it to a bit position in the bitmap. On the other hand, if the UL-DL maps indicate at 820 that this mobile station is being newly added to the group that is targeted by this frame, then at 845 the mobile station may change its internal indicator to reflect its new bit position in the bitmap for this new group. If the bit at that bit position indicates that the mobile station has data scheduled in this frame (e.g., the bit=a '1' at 850), then the mobile station may read that data at 855.

If the mobile station is neither being added to nor removed from a group, then at 825 it may retrieve the current bit position and group number that it has stored in its internal indicator to determine if it is included in the bitmap in this frame. If so, it may examine the value of the appropriate bit in the bitmap at 850, and read any associated data from the frame at 855. But if it does not have an assigned bit position in the bitmap of this frame, then it may determine at 830 if it is being dynamically scheduled in this frame. If so, it may read the indicated data from the frame at 835. The process of FIG. 8 is oriented towards reading downlink data from the frame, using the DL bitmap. A similar process may be followed for uplink transmissions from the mobile station, using the UL bitmap. However, blocks 835 and 855 in flow diagram 800 would read 'Transmit Data' instead of 'Read Data' for uplink transmissions.

FIGS. 7 and 8 describe how to handle the changes that occur in the groupings and in the bitmap when the MCS for one or more mobile stations changes. However, in some situations every mobile station in a group will continue to have the same MCS, remain in the same group, and have the same bit values in the bitmap (indicating whether the mobile station has data scheduled in this frame), for multiple consecutive frames. In such a situation, the bitmap will be exactly the same for a number of consecutive frames that are directed to that group. (Other frames to other groups may be transmitted between the frames to this group, but they may be ignored for the purpose of determining 'consecutive' frames to this group.)

When multiple consecutive frames to the group use an identical bitmap, only the bitmap in the first frame contains new information. The bitmaps in the subsequent frames are therefore redundant and unnecessary, since the mobile stations already know what the bitmaps in those frames will look like. These redundant bitmaps may therefore be eliminated for the frames subsequent to the first frame, until the bitmap changes. To know whether a bitmap has changed, a small field (e.g., a 1-bit field), may be used to indicate whether there is a bitmap in the frame. For example, a '1' in the field may indicate that the bitmap has changed, and that the new bitmap is included in this frame. A '0' in that field may indicate that the bitmap has not changed, is not included in the frame, and that the mobile stations should use the same bitmap that was used for the previous frame for this group. In this manner, the decision on whether to include a bitmap in the frame may be made by the base station on a frame-by-frame basis, and the mobile stations may determine whether to reuse the bitmap of the previous frame on a frame-by-frame basis.

Figure 9:
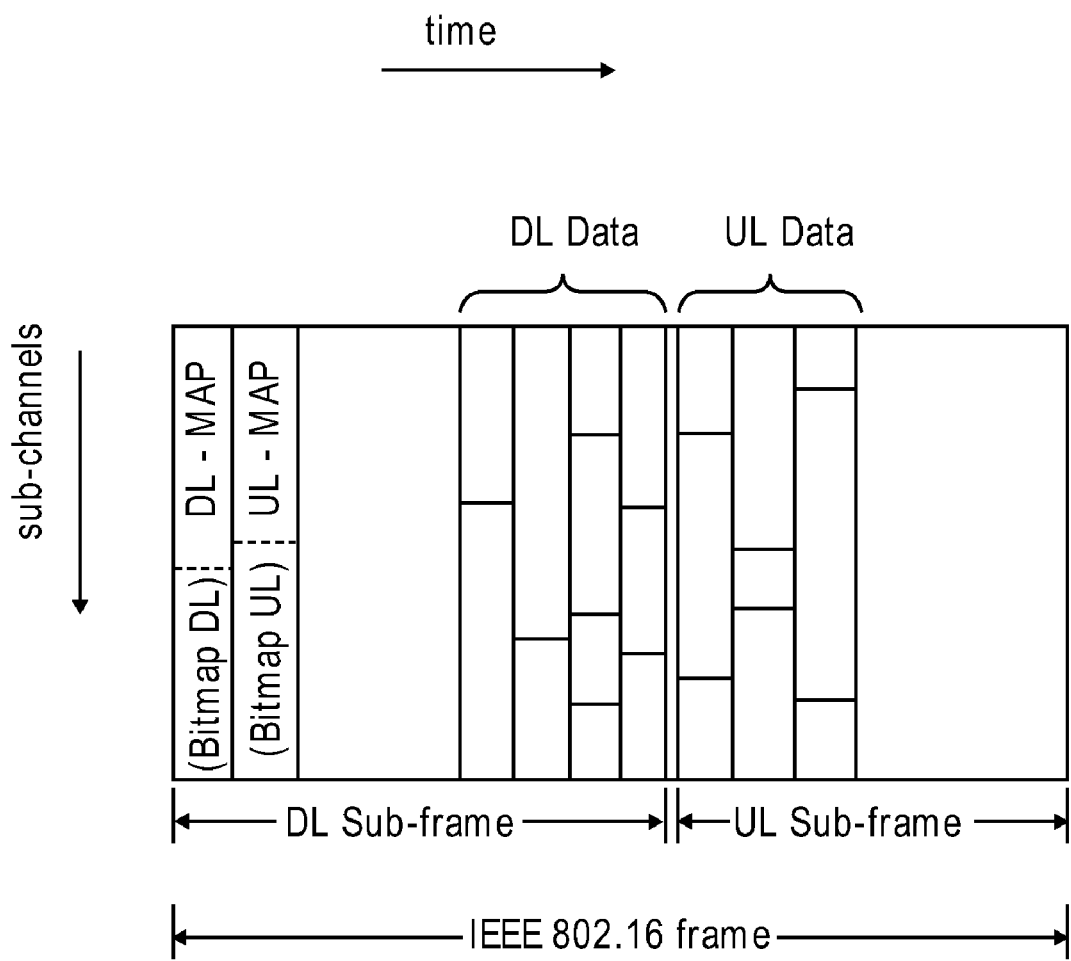
FIG. 9 shows a frame containing bitmaps, according to an embodiment of the invention.

FIG. 9 shows a frame containing bitmaps, according to an embodiment of the invention. Except for the novel sub-fields labeled 'Bitmap DL' and 'Bitmap UL', the illustration of FIG. 9 may follow the overall conventional layout used to describe an OFDMA frame, in which the vertical axis indicates the multiple sub-channels being used in parallel, and the horizontal axis indicates the passage of time, typically in increments known as symbols. Except for the aforementioned Bitmap DL and Bitmap UL fields, the fields shown in FIG. 9 may comply with the specifications of the IEEE (Institute of Electrical and Electronic Engineers) standard 802.16, as published in 2007, but some embodiments may encompass devices, methods, protocols, etc. that do not totally comply with this standard.

In the illustrated frame, the first part of the frame comprises the downlink (DL) sub-frame devoted to transmissions from the base station to the mobile stations, while the last part of the frame comprises the uplink (UL) sub-frame devoted to transmissions from the mobile stations to the base station. The first part of the DL sub-frame contains a DL-Map that tells each mobile station when and where (times and sub-channels) the mobile station can find data intended for it in the DL sub-frame, and an UL-Map that tells each mobile station when and where (times and sub-channels) it may transmit to the base station during the UL sub-frame. These times and sub-channels are indicated as DL Data and UL Data in the figure, and are indexed by the DL-Map and UL-Map, respectively. In addition to the conventional components of the DL-MAP and UL-MAP, one or more bitmaps (labeled Bitmap DL) may be contained in the DL-MAP, and one or more bitmaps (labeled Bitmap UL) may be contained in the UL-MAP, as indicated in FIG. 9. In some embodiments, the bitmaps of Bitmap DL and Bitmap UL may follow the formats exemplified in FIG. 6, but other embodiments may use different formats. Bitmap DL may be used to group mobile stations for downlink communications, and Bitmap UL may be used to group mobile stations for uplink communications. The example places these bitmaps within DL-MAP and UL-MAP, but other embodiments may use other placements. The placements of these examples are useful when the DL and UL sub-frames occur at different times, but the same principles may be applied when the DL and UL sub-frames occur on different sub-channels at the same, or at least overlapping, times.

Reduced Headers Permitted by Grouping

Referring again to FIG. 9, the DL sub-frame contains a section labeled 'DL Data', which includes the actual data that is directed to the various mobile stations, and is indexed by the DL Map. Similarly, the UL sub-frame contains a section labeled 'UL Data', which will include the actual data that the mobile stations will transmit. Each of these sections is divided into blocks that indicate boundaries between the data for each mobile station. Each of these blocks may contain one or more packets directed to (or transmitted from) the specific mobile station, and each packet may start with a header that describes how to interpret the remainder of the packet. In some embodiments, these packets are at the Medium Access Control (MAC) level.

In conventional systems, each of these packets may contain a Connection Identifier (CID) in the packet's header, which defines which mobile station this packet belongs to. However, when transmissions of a constant size are being used (which is common with such data types as Voice-over-IP), each mobile station in the group may determine from the bitmap which of the packets in the DL data belongs to it. For example, if each transmission to a mobile station requires 4 slots of time, and a particular mobile station knows that two other mobile stations have data scheduled ahead of it by the bitmap, then the data for this particular mobile station would start with the $9^{th}$ slot. The general formula would be starting slot for this $MS=(n*m)+1$ where n=the number of slots per transmission to a MS, and m=the number of MS's scheduled for data ahead of this MS. Note: m does not correspond to the bit position in the bitmap, it corresponds to the number of such bit positions whose value indicates data in this frame.

Thus, the CID portion of the header in some packets may be eliminated, since that information may be obtained through the bitmap, and the size of the header may therefore be reduced. FIGS. 10A and 10B show two types of headers for a packet, according to an embodiment of the invention. The various fields are shown, with the number of bits devoted to each field shown in parentheses. The 48-bit header of FIG. 10A contains the 16-bit CID field, while the 32-bit header of FIG. 10B (called a compressed header in this document) does not contain the CID field. Since mobile stations need to know which type of header is being used in order to correctly interpret that header, a field in the header may provide that information. In some embodiments, a single bit in the header may be used to indicate whether the header is a normal header or a compressed header. Since bit 13 of the header was currently unassigned at the time of this writing (shown as HI in FIGS. 10A and 10B), some embodiments may use bit 13 for the Header Indicator field, although other embodiments may use other bits, or may use multi-bit fields. Other than the CID field and the HI field, the other fields shown in FIGS. 10A,B are shown as identical fields in both formats, are unrelated to compressed the headers, and are not further described here.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising
   a wireless communications device to perform as a base station in a wireless communications network, the base station to:
   receive information from a wireless mobile station in the network;
   determine, based on the information, a first value of a time period to be considered for a period of persistence for persistent scheduling with the wireless mobile station;
   compare the first value to a pre-determined second value and to a pre-determined third value larger than the pre-determined second value;
   use the third value for the period of persistence if the first value is greater than the third value;
   use the first value for the period of persistent if the first value is greater than the second value and less than the third value; and
   use dynamic scheduling instead of persistent scheduling with the mobile station if the first value is less than the second value.

2. The apparatus of claim 1, wherein:
   said information received from the wireless mobile station comprises channel condition information; and
   said determining the first value comprises deriving the first value from the channel condition information.

3. The apparatus of claim 2, wherein said channel condition information comprises multiple values of a channel quality indicator obtained over a period of time.

4. The apparatus of claim 3, further comprising a timer in the wireless communications device, the timer to be used to measure the period of time.

5. The apparatus of claim 4, wherein the timer is to be set to:
   the first value if the first value is used as the period of persistence;
   the third value if the third value is used as the period of persistence; and
   the second value if dynamic scheduling is to be used.

6. The apparatus of claim 1, wherein:
   said information received from the wireless mobile station comprises an estimate of the first value as derived by the mobile station; and
   said determining the first value comprises using the estimate of the first value as the first value.

7. The apparatus of claim 1, wherein the base station is to receive the information in an orthogonal frequency divisional multiple access format.

8. An article comprising
   a tangible non-transitory machine-readable medium that contains instructions, which when executed by one or more processors result in performing operations comprising:
   receive information from a wireless mobile station in a network;
   determine, based on the information, a first value of a time period to be considered for a period of persistence for persistent scheduling with the wireless mobile station;
   compare the first value to a pre-determined second value and to a pre-determined third value larger than the pre-determined second value;
   use the third value for the period of persistence if the first value is greater than the third value;
   use the first value for the period of persistent if the first value is greater than the second value and less than the third value; and
   use dynamic scheduling instead of persistent scheduling with the mobile station if the first value is less than the second value.

9. The article of claim 8, wherein:
   said information received from the wireless mobile station comprises channel condition information; and
   the operation of determining the first value comprises deriving the first value from the channel condition information.

10. The article of claim 9, wherein said channel condition information comprises multiple values of a channel quality indicator obtained over a period of time.

11. The article of claim 10, wherein the operations further comprise operating a timer in the wireless communications device to measure the period of time.

12. The article of claim 11, wherein the operation of operating a timer comprises setting the timer to:
- the first value if the first value is used as the period of persistence;
- the third value if the third value is used as the period of persistence; and
- the second value if dynamic scheduling is to be used.

13. The article of claim 8, wherein:
- said information received from the wireless mobile station comprises an estimate of the first value as derived by the mobile station; and
- the operation of determining the first value comprises using the estimate of the first value as the first value.

14. The article of claim 8, wherein the operation of receiving information comprises receiving the information in an orthogonal frequency division multiple access format.

* * * * *